(12) United States Patent
Stieglbauer et al.

(10) Patent No.: US 7,259,349 B2
(45) Date of Patent: Aug. 21, 2007

(54) METHOD FOR MONITORING THE QUALITY OF SPOT WELDING

(75) Inventors: Walter Stieglbauer, Manning (AT); Manfred Wimmer, Wels (AT); Wolfgang Zauner, Wels (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 10/523,957

(22) PCT Filed: Sep. 3, 2003

(86) PCT No.: PCT/AT03/00254

§ 371 (c)(1), (2), (4) Date: Feb. 4, 2005

(87) PCT Pub. No.: WO2004/022278

PCT Pub. Date: Mar. 18, 2004

(65) Prior Publication Data

US 2006/0163213 A1 Jul. 27, 2006

(30) Foreign Application Priority Data

Sep. 6, 2002 (AT) .............................. A 1337/2002

(51) Int. Cl.
*B23K 11/25* (2006.01)
(52) U.S. Cl. ............ 219/109; 219/110; 219/117.1
(58) Field of Classification Search ................ 219/108, 219/109, 110, 117.1
See application file for complete search history.

(56) References Cited

U.S. PATENT DOCUMENTS

| | | | | |
|---|---|---|---|---|
| 3,940,624 A | * | 2/1976 | Simmons | 250/358.1 |
| 4,168,430 A | * | 9/1979 | Denis et al. | 250/338.1 |
| 4,782,230 A | | 11/1988 | Heinzel | 250/338.1 |
| 5,575,934 A | * | 11/1996 | Takakuwa et al. | 219/109 |
| 5,961,854 A | * | 10/1999 | Mueller et al. | 219/119 |
| 6,057,523 A | * | 5/2000 | Fujii et al. | 219/110 |
| 6,294,753 B1 | * | 9/2001 | Fujii et al. | 219/110 |
| 6,414,261 B1 | * | 7/2002 | Maetschke | 219/109 |

FOREIGN PATENT DOCUMENTS

| | | |
|---|---|---|
| EP | 0 830 914 | 3/1998 |
| JP | 4-17981 A * | 1/1992 |

* cited by examiner

*Primary Examiner*—Kevin P. Kerns
(74) *Attorney, Agent, or Firm*—Collard & Roe, P.C.

(57) ABSTRACT

A method for monitoring the quality of spot welding, in particular for robotic applications. Workpieces, such as metal sheets are welded together using spot welding tools. The sheets are placed between at least two electrodes, which are pressed against one another and supplied with energy. The spot weld is evaluated using an evaluation element, in particular an optical visualization. A tape is placed between the electrodes or electrode caps and the sheets. The tape is transported onwards after the welding process. The tape is configured in such a way that a mirror-image, in particular a proportional reproduction or impression of the spot weld that has been produced on the workpiece is created by the welding process on the tape. The reproduction or impression is detected and evaluated by the evaluation element and the size, shape and position of the spot weld are deduced.

19 Claims, 2 Drawing Sheets

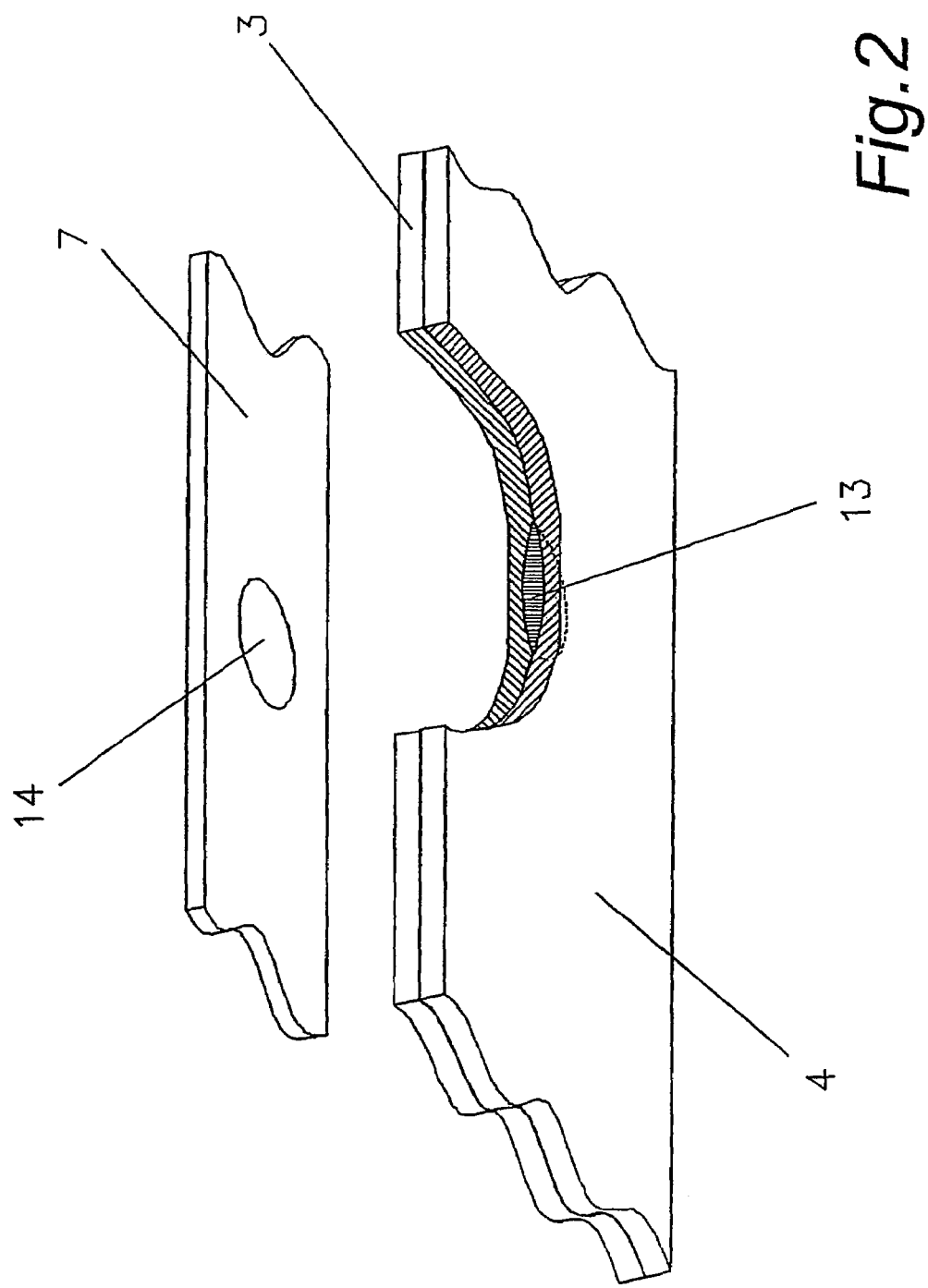

METHOD FOR MONITORING THE QUALITY OF SPOT WELDING

CROSS REFERENCE TO RELATED APPLICATIONS

Applicants claim priority under 35 U.S.C. §119 of Austrian Application No. A 1337/2002, filed Sep. 6, 2002. Applicants also claim priority under 35 U.S.C. §365 of PCT/AT2003/000254 filed Sep. 3, 2003. The international application under PCT article 21(2) was not published in English.

BACKGROUND OF THE INVENTION

The invention relates to a method for monitoring the quality of spot welds, particularly for robotic applications. The most different systems for assessing the quality of a welding spot have already been known, as is to be taken from EP 0 830 914 B1.

U.S. Pat. No. 3,940,624 A describes a method and a device for monitoring welds by radiating the welding site with an infrared-light source and optically detecting the resulting reflected or transmitted radiation. According to a variant of the described method, a MYLAR film is drawn over the welding site with a liquid crystal and the change in the liquid crystal brought about by the heat radiated from the welding site is optically detected. In doing so, it is disadvantageous that the welding spot itself or the liquid crystal display, which is not stable though, is evaluated, thus necessitating site-related and time-related measurements.

SUMMARY OF THE INVENTION

The invention is based on the object of providing a method for monitoring the quality of spot welds, particularly for robotic applications, by which the detection of a welding spot is rendered feasible in a simple manner, this being not directly effected on the metal sheet to be welded.

The term metal sheet is meant to encompass any type of work-pieces or structural components to be connected by spot welding methods, such as, for instance, car bodies. Welding spot also comprises the term weld nugget, which is commonly used in technical circles.

The object of the invention is achieved in that a strip or foil is inserted between the electrodes or electrode caps and the workpieces, particularly metal sheets or structural components, which strip or foil is conveyed on after a welding process, and wherein the strip or foil is configured in a manner that a mirror-inverted and, in particular, proportional image or reproduction of the weld nugget or welding spot produced on the workpiece is formed on the strip or foil during the welding process and said mirror-inverted image or reproduction formed on the strip or foil is detected and evaluated by the evaluation means, with the size, shape and position of the welding spot or weld nugget being concluded from said image or reproduction by said evaluation device, or a control and/or evaluation means of a welding apparatus. By conveying the strip or foil on after a welding process, it is safeguarded that only a single reproduction of a welding spot will always be made in a defined strip area. In doing so, it is advantageous that such evaluation may take place at any time, since it will always be feasible to draw conclusions as to the respective welding spot on the workpiece or metal sheet from the mirror-inverted reproductions formed on the strip. Another essential advantage resides in that an evaluation may be carried out directly on the welding tong, thus preventing downtimes during automated production. In doing so, it is also advantageous that it is not the welding spot on the workpiece or metal sheet itself which is evaluated, but a mirror-image reproduction of the welding spot, so that any evaluation can be done in a locally unrestricted manner. The method excludes a number of uncertainties like electrode wear, variations in the sheet metal thickness or layer thickness, lot-specific material deviations, etc., inherent in conventional quality monitoring systems, since the method according to the invention aims to detect the size, shape and position of a reproduction or image of the welding spot or weld nugget. Another advantage resides in that the accessibility of a commercially available welding tong is not affected, since an evaluation may be realized on the welding tong in an area remote from the welding process, whereas with commercially available systems and, in particular, ultrasonic systems, an evaluation must be performed in the region of the welding process, which would call for increased structural dimensions in the region of the electrode pick-up assembly, thus deteriorating the handling and accessibility of such known systems. Another, very essential advantage resides in that the strip serves at the same time as an electrode protection means and hence substantially increases the service life of the electrode. Consequently, one of the major causes for defective welding spots (worn electrodes) is excluded.

In addition, it is feasible and advantageous to determine the shape and position of the welding spot or weld nugget in order to enable the determination of the relation between the longitudinal and transverse strengths.

The method can include the step of tuning the material of the strip or foil, to the materials of the metal sheets to be welded so that the temperature occurring during welding produces an image which is formed on account of a detectable change in a condition.

In one embodiment, the step of welding the metal sheets comprises welding aluminum sheets using a strip having a tin coating.

In another embodiment the step of welding metal sheets comprises welding zinc coated sheets using a strip having a coating of copper.

Another embodiment includes the step of applying a coat of lacquer on the strip wherein the lacquer evaporates at a temperature generated by a welding process forming a mirror inverted proportional image.

The above measures are advantageous too, since they enable the optimum mutual adaptation of the materials involved so as to ensure a reproduction on the strip as perfect as possible.

Measures that are taken when evaluating the strip at each welding point are also advantageous, since they enable an optimum operation sequence to be carried out as a function of the required priority or necessity. It is also feasible to evaluate specific welding spots immediately after welding and other welding spots only after the execution of all welding operations to be carried out.

Some of the measures can be obtained by determining the size, shape and position of the welding spot by taking an optical picture of the image on the strip using a camera and then measuring the image on the strip taken by the camera, Another method for obtaining measures can include determining a size, shape and position of a welding spot using a digital signal that is emitted by the evaluation means, wherein the digital signal is then evaluated to determine the size, shape and position of the welding spot. These measures can be provided in an advantageous manner that already known systems and, in particular, software programs may be used to detect and measure pictures or data for the determination of size, shape and position.

Also of advantage is an embodiment which includes the step of multiplying the dimensions of the image by a factor of the deposited weld to determine the actual dimensions of the welding spot. Another embodiment includes comparing the image on the strip with the deposited reference weld to evaluate the welding point. These measures, can be advantageous since they enable the use of deposited references, which are deposited for every single case of application. Such references may comprise a deposited picture of a standard weld or deposited parameters like the size, shape or position of a standard weld.

Moreover, the measures that involve recording the determined dimensions of the welding spot in a database are advantageous in that they enable the further processing or recalling of data at any time.

Measures that involve removing the strip from the spot welding apparatus, and evaluating in a separate evaluation unit the strip at an end of the welding process are of advantage too, since in that case the evaluation means need not be arranged on site, i.e., directly on the robot.

BRIEF DESCRIPTION OF THE DRAWINGS

In the following, the invention will be explained in more detail by way of an exemplary embodiment.

FIG. 2 is a diagrammatic representation of a completed welding process with a section through the welding spot in a simplified, schematic illustration.

DETAILED DESCRIPTION

Figure 1:
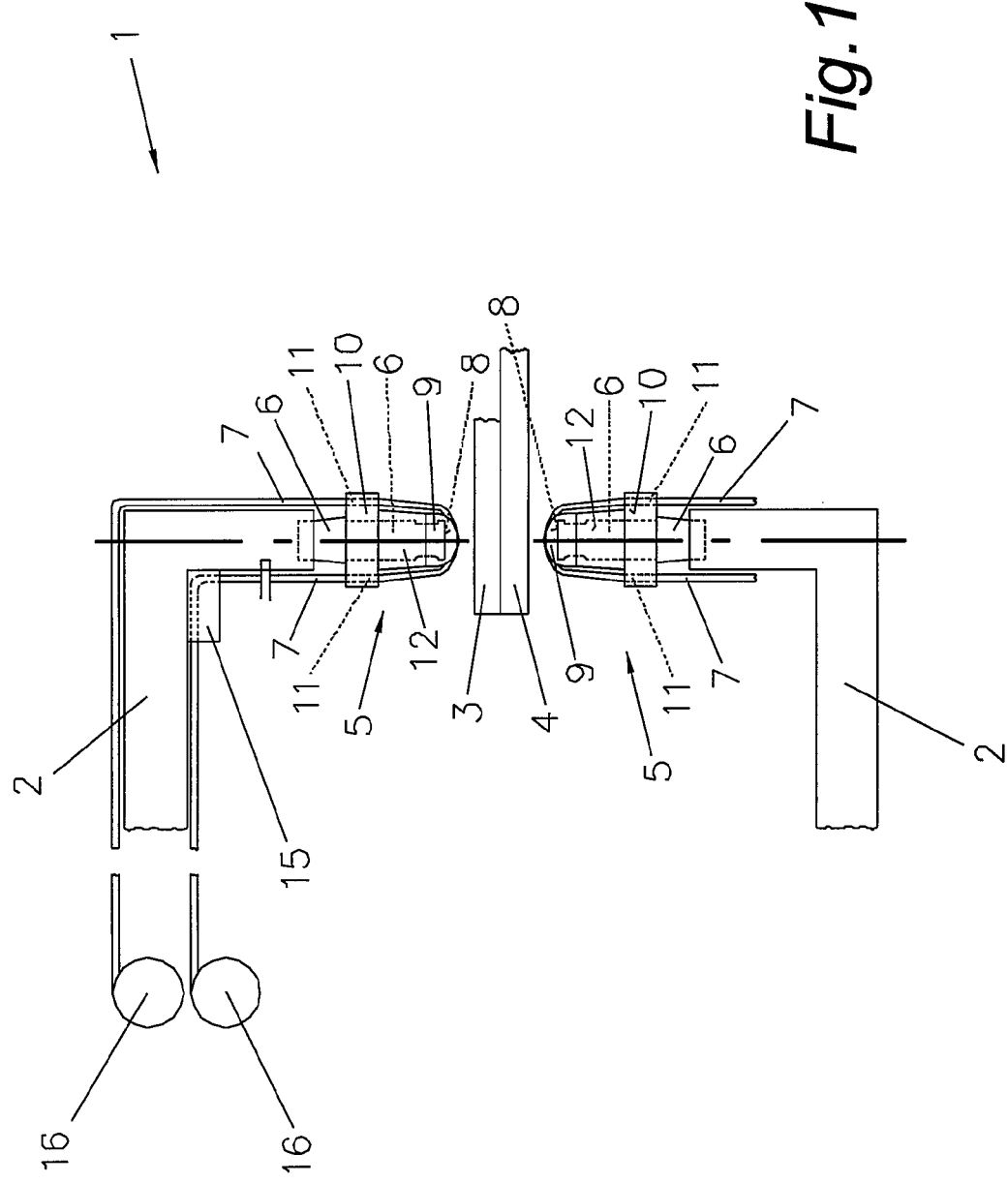
FIG. 1 is a diagrammatic representation in a simplified, schematic illustration, of a spot welding device used in the method according to the invention for monitoring the quality of spot welds.

FIGS. 1 and 2 depict a spot welding device 1 and, in particular, a welding tong 2 for the resistance welding of metal sheets 3, 4 or structural components, said spot welding device 1 being preferably employed in robotic applications. In a preferred manner, the spot welding device 1 is equipped with a spot welding tool 5 and a winding device 16 for winding a unwinding a strip 7 or foil transversely engaging at an electrode 6, said winding device 16 being arranged either directly on the welding tong 2 or externally therefrom.

The guidance of the strip 7 about the electrode 6 may be realized in the most different ways, which is why just one exemplary embodiment will be briefly explained below. In this context, it should be mentioned that such an exemplary embodiment does not require the use of a spot welding tool 5, but merely the presence of an electrode 6, any further components 16 for guiding and winding or unwinding the strip 7 being designed as separate devices 16 and arranged accordingly. In the embodiment illustrated, a spacer 9 is arranged around the electrode 6 in the region of an electrode cap 8, or contact surface of the electrode 6 with the metal sheet 3, 4 or structural component. The spacer 9 is, for instance, movably attached to the electrode 6 in a manner that additional pressure can be imparted on the workpiece or metal sheets 3, 4 via the spacer 9. It is, furthermore, ensured by the movable mounting of the spacer 9 that the spacer 9 will lift the strip 67 off the electrode 6 after a welding process, i.e., that the spacer 9 will automatically lift the strip 7 off the electrode surface or electrode cap 8 during or after the opening of the welding tong 2, whereas the spacer 9 will be displaced relative to the electrode 6 during closing of the welding tong 2, thus causing the strip 7 to enter into abutment on the electrode 6.

In the exemplary embodiment illustrated, the spot welding tool 5 is comprised of an annular assembly which is inserted into the welding tong 2, wherein the spacer 9 is formed by a metal ring of low electrical conductivity, which is axially displaceable on the cylindrical electrode 6. In the relieved state, the spacer 9 projects beyond the electrode 6. A support element 10 comprising guide channels 11 for receiving the strip 7 is further arranged on the electrode 6. An adjustment means 12, particularly a spring element, is arranged between the support element 10 and the spacer 9, thus enabling the spacer 9 to be displaced along the electrode 6 by appropriate pressure application, with the adjustment means 12 being deformed or displaced.

The components, particularly metal sheets 3, 4, are mechanically pressed against each other by the welding tong 2 via the electrode 6 over the entire spot welding process. In spot-welding, the metal to be connected is smelted rapidly for a short period of time by ohmic resistance heating caused by a current flow between the electrodes 6, wherein, after this, the smelted region is rapidly cooled again and solidifies by heat conduction, with the parts or metal sheets 3, 4 thus having been connected by a welding spot 13 or weld nugget, as is schematically illustrated in FIG. 2.

The heat amount formed, and hence the volume of smelted material, depend on the conductivity of the material of the metal sheets 3, 4, on the welding time, on the welding current and, to be more precise, on the current density through the desired welding spot 13 or weld nugget, and on the individual resistances of the welding power circuit. The following parameters or conditions have to be taken into account in a welding process of this type and usually can be balanced only by considerable automatic control engineering measures, or cannot be monitored or influenced at all: The electrical and thermal conductivities are material-specific, yet largely determined. The welding time is to be observed at relatively low expenditures. The welding current can be kept constant by automatic control. Yet, the contact surface may become too large, and hence the current density too small, on account of deformed and, in particular, worn electrodes 6. It may, moreover, happen that current flows past the desired welding spot 13 without contributing to material smelting due to preceding welding spots 13 or deformations of the metal sheets 3, 4. The resistances of the welding power circuit and, in particular, the preponderant contact resistances are subject to unpredictable and uncontrollable fluctuations caused, for instance, also by contaminated metal sheets 3, 4 or contaminated electrodes 6. Furthermore, poor welding spots 13 may be caused by an imperfect positioning of the welding tong 2 or metal sheets 3, 4, or by deformations of the metal sheets 3, 4, which prevent the electrodes 6 from contacting the metal sheets 3, 4, or the metal sheets 3, 4 from contacting each other, as required. The above-mentioned reasons urgently call for the monitoring of the quality of welding spots and, in particular, the inspection of the welding spot 13 after a welding process.

The method according to the invention for monitoring the quality of spot welds is based on the principle of detecting the maximum temperatures with their geometric expansions on the surfaces of the metal sheet, i.e., the welding spot 13. In doing so, it is not proceeded in the manner known per se by measuring the temperature distribution on the surface of the metal sheet immediately after the welding process, e.g., by the aid of a thermal imaging camera or by an optical evaluation directly on the workpiece or metal sheet 3, 4. Instead, a well conductive foil or strip 7 is located between the electrode 6 and the metal sheet 3, 4 during welding. Said foil or strip 7 changes its properties as a function of the maximum temperature prevailing on the respective site. This may, for instance, be achieved by a thin coating which undergoes a clearly visible or otherwise detectable property change, or melts itself, below or in the range of the melting temperature of the material of the metal sheets 3, 4 to be welded. The change visible or measurable after welding is a measure for the size of the welding spot and automatically evaluatable at reasonable expenditures.

Both the used foil and the strip 7 as well as their possibly present coating must offer good electrical conductivities in order for the heating of the strip 7 to be effected to the major extent not directly by the welding current, but preferably by heat conduction from the metal sheets 3, 4.

As already described above, the strip 7 or foil is inserted between the electrodes 6 or electrode caps 8 and the workpieces, particularly metal sheets 3, 4 or structural components, wherein the strip 7 or foil is configured such that a mirror-inverted and, in particular, proportional image or reproduction 14 as schematically illustrated in FIG. 2, of the weld nugget or welding spot 13 formed on the workpiece or metal sheets 3, 4 will be produced on the strip 7 or on the foil, respectively. This mirror-inverted image or reproduction 14 on the strip 7 or foil is detected and evaluated by an evaluation means 15, whereby the size, shape and position of the welding spot 13 or weld nugget is concluded from said image or reproduction 14 by said evaluation means 15, or a control and/or evaluation device of a welding apparatus. The evaluation means may directly be positioned on the welding tong 2 such that the strip 7 is moved past the same, whereby the evaluation can be made. It goes without saying that the evaluation means may also be arranged externally.

The material of the strip 7 or foil, or of a coating applied thereon, is tuned to the materials of the metal sheets 3, 4 to be welded, so that the temperature occurring on the metal sheets 3, 4 during welding produces the image or reproduction 14 on the strip 7, which is formed on account of a detectable change in the condition, particularly color change, reaction or change in the aggregation state, of the strip 7 or foil, or of the coating applied thereon. A method of this type is, thus, applicable with almost any material, since the appropriate adaptation of the strip 7 will always produce a reproduction 14 capable of being evaluated in a simple form. It is also feasible to apply a coat of lacquer on the strip 7 or foil, which coat of lacquer melts or evaporates at the temperature generated by the welding process, thus again forming a mirror-inverted, proportional image or reproduction 14. For instance, when welding aluminum sheets 3, 4, a tinplate strip 7 or a strip 7 having a tin coating is preferably used, and when welding zinc-coated sheets 3, 4, a copper strip 7 or a strip 7 having a coating of copper is preferably used.

What is essential is that the strip 7 is conveyed on after every welding process such that a single welding spot 13 will be formed in an area of the strip, so as to allow the reproduction 14 formed on the strip 7 to be allocated to a particular welding spot 13 on the metal sheet 3, 4. The evaluation of the strip 7 is, for instance, effected after every welding spot 13 or after any desired number of welding spots 13.

The evaluation of such a reproduction 14 can be effected in the most different ways. In order to assess or check a welding spot 13, it is essential to the method according to the invention to produce a mirror-inverted reproduction 14 on the strip 7 or foil for subsequent evaluation rather than using the welding spot 13 itself, as is known from the prior art. In order to evaluate or determine the size, shape or position of the welding nugget or welding spot 13, an optical picture is, for instance, made by the evaluation means, particularly a camera, and the dimensions of the picture of the reproduction 14 or image are measured, this being feasible automatically using appropriate software programs or manually. It is further conceivable that, considering the widespread digital technology of, for instance, a digital camera, a digital signal is emitted by the evaluation means, which is evaluated for the evaluation or determination of the size, shape or position of the welding nugget or welding spot 13.

The determined dimensions of the image or reproduction 14 are preferably multiplied by a deposited reference amount in order to obtain the actual dimensions of the welding spot 13 or weld nugget. It is also feasible to compare the image or reproduction 14 formed on the strip 7 with a deposited reference in order to assess the weld nugget or welding point 13. After this, it is possible to record the determined dimensions of the weld nugget or welding spot 13 in a welding protocol or in a database. By determining the size, shape and position of the reproduction 14 it is subsequently feasible to find out, by appropriate further processing of the data, whether the produced welding spot 13 is in order. Such evaluations are automatically performed by the evaluation means or welding apparatus through suitable software programs. It is also feasible to remove the strip 7 or foil from the welding tong 2 or spot-welding apparatus and, in particular, from the winding device to evaluate and even archive the same in a separate evaluation unit at the end of a welding process, which may comprise several welding spots 13. The allocation of the individual reproductions 14 on the strip 7 to the individual welding spots 13 on the metal sheet 3, 4 or workpiece is readily feasible by robotic application, since it is precisely defined in the robot where and in what order the welding spots 13 are being produced.

Finally, it should be noted that individual states or illustrations have been disproportionally represented in the previously described exemplary embodiments in order to enhance the understanding of the solution according to the invention. Moreover, independent solutions according to the invention may also be formed by individual states or representations of the previously described combinations of the characteristic features of the individual exemplary embodiments in connection with other single characteristic features taken from other exemplary embodiments.

Accordingly, while a few embodiments of the present invention have been shown and described, it is to be understood that many changes and modifications may be made thereunto without departing from the spirit and scope of the invention as defined in the appended claims.

The invention claimed is:

1. A method for monitoring the quality of spot welds, for robotic applications comprising the following steps:
   inserting a strip between at least two electrodes and metal sheets;
   welding said metal sheets together via spot-welding tools by pressing said at least two electrodes opposite each other with said metal sheets being arranged therebetween to create a spot weld;
   conveying said strip past said at least two electrodes and said metal sheets after said step of welding metal sheets together, and wherein said strip is configured so that it forms an image representing the spot weld;
   detecting and evaluating said image formed on said strip;

assessing said spot weld on said metal sheets via optical visualization of said image on said strip; and determining the size, shape and position of the spot weld on said metal sheets from said image on said strip.

2. The method as in claim 1, further comprising the step of matching the material of the strip to the materials of the metal sheets to be welded so that a temperature occurring during welding produces an image which is formed on account of a detectable change in a condition.

3. The method as in claim 1, wherein said step of welding said metal sheets comprises welding aluminum sheets using a strip having a tin coating.

4. The method as in claim 1, wherein said step of welding metal sheets comprises welding zinc coated sheets using a strip having a coating of copper.

5. The method as in claim 1, further comprising the step of applying a coat of lacquer on the strip wherein said lacquer evaporates at a temperature generated by a welding process forming a mirror inverted proportional image.

6. The method as in claim 1, wherein said step of evaluating said strip occurs at each spot weld.

7. The method as in claim 1, wherein said step of evaluating includes determining the size of the spot weld by taking an optical picture of said image on said strip using a camera and then measuring said image on said strip taken by the camera.

8. The method as in claim 1, wherein said step of evaluation comprises determining a size, shape and position of a spot weld using a digital signal that is emitted by said evaluation means, wherein said digital signal is then evaluated to determine the size, shape and position of the welding spot.

9. The method as in claim 1, further comprising the step of multiplying the dimensions of said image by a factor of a deposited weld to determine an actual set of dimensions of the spot weld.

10. The method as in claim 1, further comprising the step of comparing said image on said strip with a deposited reference weld to evaluate the welding point.

11. The method as in claim 1, further comprising the step of recording a set of determined dimensions of the spot weld in a database.

12. The method as in claim 1, further comprising the steps of removing the strip from said spot welding apparatus, and evaluating in a separate evaluation unit of said strip at an end of a welding process.

13. The process as in claim 2, wherein said step of matching the material of the strip includes tuning the material of the strip to create a detectable color change.

14. The process as in claim 2, wherein said step of matching the material of the strip includes tuning the material of the strip to create a detectable change in a reaction of an aggregation state of a strip.

15. The process as in claim 2, wherein said step of matching the material of the strip includes tuning the material of the strip to create a detectable change in the coating applied on the strip.

16. The method as in claim 1, wherein said step of evaluating includes determining the shape of the spot weld by taking an optical picture of said image on said strip using a camera and then measuring said image on said strip taken by the camera.

17. The method as in claim 1, wherein said step of evaluating includes determining the position of the spot weld by taking an optical picture of said image on said strip using a camera and then measuring said image on said strip taken by the camera.

18. The method as in claim 1, wherein said step of evaluating includes determining the size, shape and position of the spot weld by taking an optical picture of said image on said strip using a camera and then measuring said image on said strip taken by the camera.

19. The process as in claim 1, wherein said step of assessing said spot weld comprises assessing a mirror image of said spot weld formed on said strip.

* * * * *